United States Patent
Ang

(10) Patent No.: US 8,847,544 B2
(45) Date of Patent: Sep. 30, 2014

(54) POWER SUPPLY DEVICE FOR ELECTRIC POWERED VEHICLE, CONTROL METHOD THEREOF, AND ELECTRIC POWERED VEHICLE

(75) Inventor: Wanleng Ang, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/880,075

(22) PCT Filed: Oct. 28, 2010

(86) PCT No.: PCT/JP2010/069142
§ 371 (c)(1),
(2), (4) Date: Apr. 18, 2013

(87) PCT Pub. No.: WO2012/056543
PCT Pub. Date: May 3, 2012

(65) Prior Publication Data
US 2013/0249495 A1    Sep. 26, 2013

(51) Int. Cl.
| | |
|---|---|
| *H01M 10/46* | (2006.01) |
| *B60L 3/00* | (2006.01) |
| *B60L 11/18* | (2006.01) |
| *B60L 7/14* | (2006.01) |
| *B60L 11/00* | (2006.01) |
| *H02J 7/04* | (2006.01) |
| *H02J 7/00* | (2006.01) |
| *B60L 15/00* | (2006.01) |

(52) U.S. Cl.
CPC ............. *H02J 7/047* (2013.01); *Y02T 10/7022* (2013.01); *Y02T 10/642* (2013.01); *B60L 3/0046* (2013.01); *Y02T 90/127* (2013.01); *B60L 11/189* (2013.01); *B60L 7/14* (2013.01); *Y02T 10/7088* (2013.01); *Y02T 10/7044* (2013.01); *B60L 11/005* (2013.01); *B60L 2210/30* (2013.01); *B60L 11/1862* (2013.01); *B60L 2240/545* (2013.01); *Y02T 10/7216* (2013.01); *H02J 7/0068* (2013.01); *B60L 2240/423* (2013.01); *B60L 2210/40* (2013.01); *Y02T 90/121* (2013.01); *B60L 2260/58* (2013.01); *B60L 11/1894* (2013.01); *B60L 2200/14* (2013.01); *Y02T 10/705* (2013.01); *B60L 15/007* (2013.01); *B60L 2240/80* (2013.01); *B60L 11/1803* (2013.01); *Y02T 90/34* (2013.01); *B60L 2210/10* (2013.01); *Y02T 90/14* (2013.01); *B60L 11/1816* (2013.01); *Y02T 10/7241* (2013.01)
USPC .......................................... 320/104; 320/150

(58) Field of Classification Search
USPC ................. 320/104, 107, 114, 134, 136, 150; 180/65.1, 65.265, 65.29; 307/9.1, 10.1
See application file for complete search history.

(56) References Cited

U.S. PATENT DOCUMENTS

| | | | |
|---|---|---|---|
| 8,242,627 B2 * | 8/2012 | Ichikawa | ..................... 307/10.1 |
| 2003/0231005 A1 | 12/2003 | Kohama et al. | |
| 2010/0156352 A1 | 6/2010 | Muta et al. | |
| 2011/0187184 A1 | 8/2011 | Ichikawa | |

FOREIGN PATENT DOCUMENTS

| | | |
|---|---|---|
| JP | A-2000-40536 | 2/2000 |
| JP | A-2003-272712 | 9/2003 |
| JP | A-2007-221886 | 8/2007 |
| JP | A-2009-224256 | 10/2009 |
| JP | A-2009-225587 | 10/2009 |

* cited by examiner

*Primary Examiner* — Edward Tso
(74) *Attorney, Agent, or Firm* — Oliff PLC

(57) ABSTRACT

An electric load is electrically connected to a path between an external power supply and a power storage device. An ECU executes temperature-rise control, when the temperature of the power storage device is low, ensuring power consumption of the electric load in association with charging/discharging of the power storage device. During execution of temperature-rise control, the ECU sets a power command value of the external charger, alternately causing a discharging mode having the output power of the external charger positively controlled and in which power consumption of the electric load is ensured in association with discharging of the power storage device, and a charging mode having the output power of the external charger negatively controlled and in which power consumption of the electric load is ensured in association with charging of the power storage device.

13 Claims, 5 Drawing Sheets

POWER SUPPLY DEVICE FOR ELECTRIC POWERED VEHICLE, CONTROL METHOD THEREOF, AND ELECTRIC POWERED VEHICLE

TECHNICAL FIELD

The present invention relates to a power supply device for an electric powered vehicle, a method of controlling the power supply device, and an electric powered vehicle. More particularly, the present invention relates to an electric system of an electric powered vehicle incorporating a mechanism of allowing a vehicle-mounted power storage device to be charged by a power supply external to the vehicle.

BACKGROUND ART

For an electric powered vehicle such as an electric car and a hybrid vehicle driving a vehicle-driving electric motor by electric power from a power storage device typified by a secondary battery, there is proposed a configuration charging the power storage device by a power supply external to the vehicle (hereinafter, also simply referred to as "external power supply"). Hereinafter, the charging of a power storage device by an external power supply may also be referred to as "external charging".

For example, Japanese Patent Laying-Open No. 2009-225587 (PTL 1) discloses a configuration directed to achieving improvement in both the charging efficiency during external charging and ensuring the operation of an auxiliary machine load. Specifically, there is disclosed a configuration in which a charging path of the main battery by external charging is provided such that external charging and operation of the auxiliary machine load are allowed even if the relay between the vehicle-driving electric motor and the main battery is OFF. Further, PTL 1 discloses a configuration in which the electric power of the main battery is converted into AC power for output from an AC outlet by setting the power converter directed to external charging to allow bidirectional power conversion.

Further, Japanese Patent Laying-Open No. 2009-224256 (PTL 2) discloses a configuration to warm up a battery in view of the battery charging efficiency being degraded at the time of low temperature. Specifically, there is disclosed a configuration in which the heat from a warm-up electric heater is conveyed to a motor driving battery when the motor driving battery is to be charged by connection with an external power supply when the vehicle is not running.

CITATION LIST

Patent Literature

PTL 1: Japanese Patent Laying-Open No. 2009-225587
PTL 2: Japanese Patent Laying-Open No. 2009-224256

SUMMARY OF INVENTION

Technical Problem

A secondary battery has the internal resistance increased at the time of low temperature. Therefore, the efficiency during charging and discharging is degraded by the increase of the loss through the internal resistance. Therefore, the electric powered vehicle of PTL 1 cannot have the efficiency of external charging increased when the temperature of the main battery is low. PTL 2 teaches that battery warm up can be executed during external charging without having to provide an electric heater exclusively for battery warm-up.

However, it is noted that, according to the configuration of PTL 2, the efficiency is poor since the battery is warmed up by applying heat from outside the battery casing. Increase in the electric power required for warm up brings an issue of concern.

In view of the foregoing, an object of the present invention is to warm up a power storage device efficiently in an electric powered vehicle incorporating a mechanism of charging a vehicle-mounted power storage device by an external power supply.

Solution to Problem

According to an aspect of the present invention, a power supply device for an electric powered vehicle includes a power storage device, a power line, a power converter, a connection node, and a control device. The power storage device stores electric power input/output with respect to an electric motor generating vehicle driving power. The power line is connected to an external power supply during external charging. The power converter is configured to execute bidirectional power conversion between AC power of the power line and DC power input to and output from the power storage device. The connection node is provided to connect an electric load to a path between the external power supply and the power storage device. The control device is configured to control the DC power input to and output from the power storage device by the power converter. The control device executes temperature-rise control, in an event of a temperature of the power storage device being lower than a predetermined temperature when the external power supply is connected to the power line and the electric load is connected to the path between the external power supply and the power storage device, alternately causing a first state where the power converter is controlled such that power consumption of the electric load is ensured in association with discharging of the power storage device and a second state where the power converter is controlled such that power consumption of the electric load is ensured in association with charging of the power storage device.

Preferably, the control device controls transition from the first state to the second state and transition from the second state to the first state according to a state of charge of the power storage device.

Further preferably, the control device designates transition to the second state when SOC decreases down to a first determination value lower than the SOC at a point in time of initiating temperature-rise control in the first state, and transition to the first state when SOC increases up to a second determination value higher than the SOC at the point in time of initiating temperature-rise control in the second state.

Also preferably, the control device controls the power converter such that electric power discharging from the power storage device in the first state is equal to the power consumption of the electric load.

Alternatively and preferably, the power converter includes a charge device for converting AC power of the power line into DC power directed to charging the power storage device, and a power generation device converting the DC power from the power storage device into AC power for output to the power line. The control device stops the charge device while activating the power generation device in the first state, and stops the power generation device while activating the charge device in the second state.

Preferably, the connection node is constituted of an outlet to connect the electric load to the power line.

According to another aspect of the present invention, an electric powered vehicle includes an electric motor for generating vehicle driving power, a power storage device, a power line, a power converter, a connection node, and a control device. The power storage device stores electric power input/output with respect to an electric motor generating the vehicle driving power. The power line is connected to an external power supply during external charging. The power converter is configured to execute bidirectional power conversion between AC power of the power line and DC power input to and output from the power storage device. The connection node is provided to connect an electric load to a path between the external power supply and the power storage device. The control device is configured to control the DC power input to and output from the power storage device by the power converter. Furthermore, the control device is configured to execute temperature-rise control, in an event of a temperature of the power storage device being lower than a predetermined temperature when the external power supply is connected to the power line and the electric load is connected to the path between the external power supply and the power storage device, alternately causing a first state where the power converter is controlled such that power consumption of the electric load is ensured in association with discharging of the power storage device and a second state where the power converter is controlled such that power consumption of the electric load is ensured in association with charging of the power storage device.

Preferably, the control device controls the power converter such that electric power discharging from the power storage device in the first state is equal to power consumption of the electric load.

Alternatively and preferably, the power converter includes a charge device for converting AC power of the power line into DC power directed to charging the power storage device, and a power generation device converting the DC power from the power storage device into AC power for output to the power line. The control device stops the charge device while activating the power generation device in the first state, and stops the power generation device while activating the charge device in the second state.

Preferably, the connection node is constituted of an outlet to connect the electric load to the power line.

A further aspect of the present invention is directed to a method of controlling a power supply device for an electric powered vehicle incorporating an electric motor generating vehicle driving power. The power supply device includes a power storage device, a power line, a power converter, and a connection node. The power storage device stores electric power input/output with respect to an electric motor. The power line is connected to an external power supply during external charging. The power converter is configured to execute bidirectional power conversion between AC power of the power line and DC power input to and output from the power storage device. The connection node is provided to connect an electric load to a path between the external power supply and the power storage device. The control method includes the steps of: determining whether temperature-rise control of the power storage device is required or not based on a temperature of the power storage device, when the external power supply is connected to the power line, and the electric load is connected to the path between the external power supply and the power storage device; and executing temperature-rise control, when a determination is made that the temperature-rise control is required, by alternately causing a first state where the power converter is controlled such that power consumption of the electric load is ensured in association with discharging of the power storage device and a second state where the power converter is controlled such that power consumption of the electric load is ensured in association with charging of the power storage device.

Preferably, the step of executing includes the step of controlling transition from the first state to the second state, and transition from the second state to the first state, according to a state of charge of the power storage device.

Further preferably, the step of controlling includes the step of designating transition to the second state when SOC decreases down to a first determination value lower than the SOC at a point in time of initiating temperature-rise control in the first state, and designating transition to the first state when the SOC increases up to a second determination value higher than the SOC at the point in time of initiating temperature-rise control in the second state.

Also preferably, the step of executing includes the step of controlling the power converter such that the electric power discharging from the power storage device in the first state is equal to power consumption of the electric load.

Alternatively and preferably, the power converter includes a charge device for converting AC power of the power line into DC power directed to charging the power storage device, and a power generation device converting the DC power from the power storage device into AC power for output to the power line. The step of executing includes the step of stopping the charge device while activating the power generation device in the first state, and stopping the power generation device while activating the charge device in the second state.

Advantageous Effects of Invention

According to the present invention, a power storage device can be warmed up efficiently in an electric powered vehicle incorporating a mechanism of charging a vehicle-mounted power storage device by an external power supply.

DESCRIPTION OF EMBODIMENTS

Figure 1:
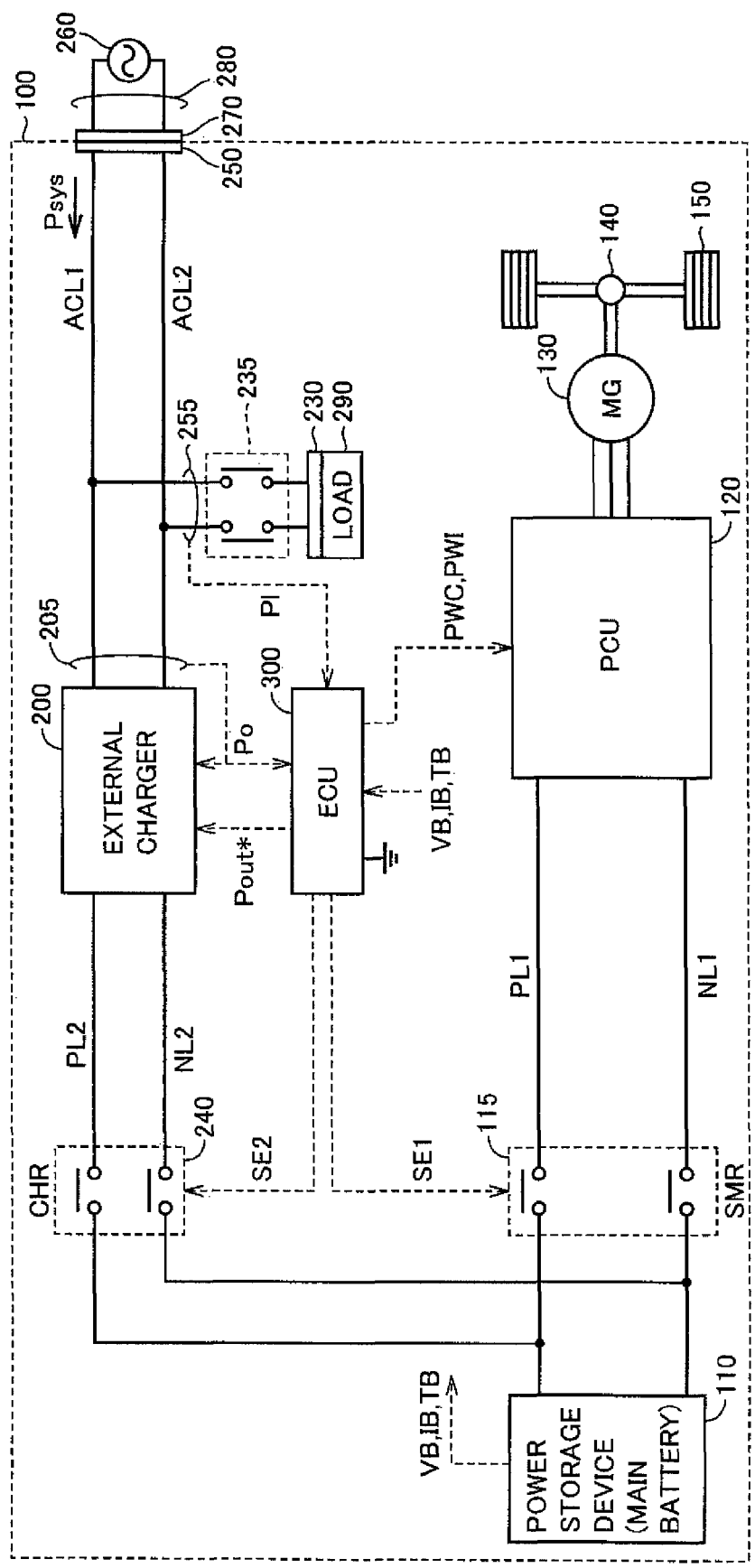
FIG. 1 is a block diagram of a configuration of an electric powered vehicle including a power supply device according to an embodiment of the present invention.

Embodiments of the present invention will be described in detail hereinafter with reference to the drawings. In the drawings, the same or corresponding elements have the same reference characters allotted, and description thereof will not be repeated in principle.

FIG. 1 is a block diagram of a configuration of an electric powered vehicle incorporating a power supply device according to an embodiment of the present invention.

Referring to FIG. 1, an electric powered vehicle 100 includes a power storage device 110 corresponding to "power storage device", a system main relay (hereinafter, also referred to as SMR) 115, a PCU (Power Control Unit) 120, a motor generator 130 that is a traction motor, a power transmission gear 140, a driving wheel 150, and a control device 300.

Power storage device 110 is an electric power storage element configured to enable charging/discharging, and is formed of a secondary battery typically represented by a lithium ion battery or nickel-metal hydride battery. The output voltage of power storage device 110 is approximately 200V, for example. Alternatively, power storage device 110 may be constituted of a storage element such as an electric double layer capacitor, or a combination of a storage element and a secondary battery.

Control device 300 is constituted of an electronic control unit including a CPU (Central Processing Unit), a memory device, and an input/output buffer, not shown. Control device 300 (hereinafter, also referred to as ECU 300) controls various apparatuses incorporated in electric powered vehicle 100. The control is not restricted to processing by software, and processing is also allowed through dedicated hardware (electronic circuit).

Power storage device 110 is connected to a power line PL1 and a ground line NL1 via SMR 115. Power line PL1 and ground line NL1 are connected to PCU 120 for driving motor generator 130. Power storage device 110 supplies to PCU 120 the electric power for generating the driving force of electric powered vehicle 100. Power storage device 110 also stores the electric power generated at motor generator 130.

The relay included in SMR 115 has one end connected to the positive terminal and negative terminal of power storage device 110. The relay in SMR 115 has the other end connected to power line PL1 and ground line NL1 connected to PCU 120. SMR 115 switches between the supply and cut off of the electric power between power storage device 110 and PCU 120 based on a control signal SE1 from ECU 300.

Figure 2:
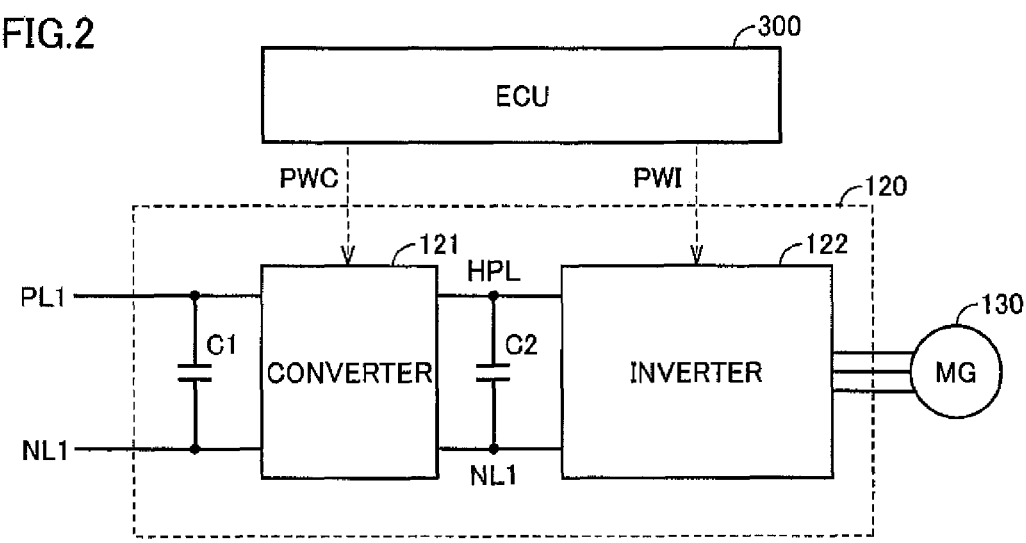
FIG. 2 is a block diagram of an exemplified configuration of the PCU shown in FIG. 1.

FIG. 2 represents an example of an internal configuration of PCU 120.

Referring to FIG. 2, PCU 120 includes a converter 121, an inverter 122, and smoothing capacitors C1 and C2.

Converter 121 carries out bidirectional power conversion from power line PL1 and ground line NL1 to power line HPL and ground line NL1 or from power line HPL and ground line NL1 to power line PL1 and ground line NL1, based on control signal PWC from ECU 300. For converter 121, the circuit configuration of a power conversion circuit capable of DC voltage conversion (for example, bidirectional chopper circuit) can be applied arbitrarily.

Inverter 122 is connected to power line HPL and ground line NL1. Based on a control signal PWI from ECU 300, inverter 122 converts the DC power supplied from converter 121 into AC power to drive motor generator 130. For inverter 122, the circuit configuration of a general 3-phase inverter may be applied.

Although a configuration having one pair of a motor generator and inverter is shown in the present embodiment, a configuration in which there are a plurality of pairs of the motor generator and inverter may be employed.

Smoothing capacitor C1 is provided between power line PL1 and ground line NL1 to reduce the voltage variation therebetween. Capacitor C2 is provided between power line HPL and ground line NL1 to reduce the voltage variation therebetween.

Referring to FIG. 1 again, motor generator 130 is, for example, a permanent magnet type synchronous electric motor including a rotor with a permanent magnet embedded.

The output torque from motor generator 130 is transmitted to driving wheel 150 via power transmission gear 140 constituted of a decelerator and/or power split mechanism not shown. Electric powered vehicle 100 runs by the torque transmitted to driving wheel 150. In a regenerative braking mode of electric powered vehicle 100, motor generator 130 can generate power by the rotation force of driving wheel 150. The generated electric power is converted into the charging power for power storage device 110 by PCU 120.

In a hybrid vehicle having an engine (not shown) incorporated in addition to motor generator 130, the required driving force for the vehicle is generated by the cooperative operation of the engine and motor generator 130. In this case, power storage device 110 can be charged using the electric power generated by the rotation of the engine.

Electric powered vehicle 100 of the present embodiment represents a vehicle incorporating an electric motor for generating the vehicle driving force. The electric powered vehicle of the present invention is intended to include a hybrid vehicle generating a vehicle driving force by an engine and electric motor, as well as an electric car and fuel cell vehicle not incorporating an engine, or the like.

In the context of the configuration of electric powered vehicle 100 shown in FIG. 1, the portion other than motor generator 130, power transmission gear 140 and driving wheel 150 constitute the power supply device for the electric powered vehicle.

The power supply device further includes, as a configuration for power storage device 110 to be externally charged by the electric power from an external power supply 260 (external charge system), an external charger 200, a charge relay 240, and an inlet for charging 250. External power supply 260 is generally constituted of a commercial AC power supply.

To inlet for charging 250 is connected a charge connector 270 of a charge cable 280 for electrically connecting external power supply 260 with electric powered vehicle 100. The electric power from external power supply 260 is transmitted to electric powered vehicle 100 via charge cable 280. Accordingly, power lines ACL1 and ACL2 are connected to external power supply 260 during external charging. Power lines ACL1 and ACL2 correspond to "electric power line".

External charger 200 is connected to inlet for charging 250 via power lines ACL1 and ACL2. External charger 200 is electrically connected with power storage device 110 via power line PL2 and ground line NL2, and a charge relay 240 (hereinafter, also referred to as CHR 240) switching on in an external charging mode.

CHR 240 is connected between the positive terminal of power storage device 110 and power line PL2, and between the negative terminal of power storage device 110 and ground line NL2. CHR 240 establishes or cuts the energizing path between power storage device 110 and external charger 200 based on a control signal SE2 from ECU 300.

In an external charging mode, an energizing path to charge power storage device 110 through the electric power from external power supply 260 is established in response to CHR 240 being switched on. In a mode other than the external charging mode (non-external charging mode), the application of the output voltage from power storage device 110 to the group of devices in the external charging system can be avoided by switching SMR 240 off.

External charger 200 converts, according to a power command value Pout* from ECU 300, AC power supplied from external power supply 260 into DC power for charging power storage device 110. Further, external charger 200 converts, according to power command value Pout* from ECU 300, DC power from power storage device 110 into AC power equivalent to the AC power from external power supply 260 for output onto power lines ACL1 and ACL2. External charger 200 is configured to execute bidirectional AC/DC power conversion. Namely, external charger 200 corresponds to "power converter".

Output power Po of external charger 200 is detected by power detector 205. When output power Po is positive (Po>0), electric power is output from external charger 200 onto power lines ACL1 and ACL2. When output power Po is negative (Po<0), electric power is applied to external charger 200 from power lines ACL1 and ACL2.

Therefore, according to the configuration of FIG. 1, power storage device 110 is discharged and charged when Po>0 and Po<0, respectively. Output power Po of external charger 200 is under control of power command value Pout* from ECU 300. In other words, the charging/discharging of power storage device 110 can be controlled by power command value Pout*.

Figure 3:
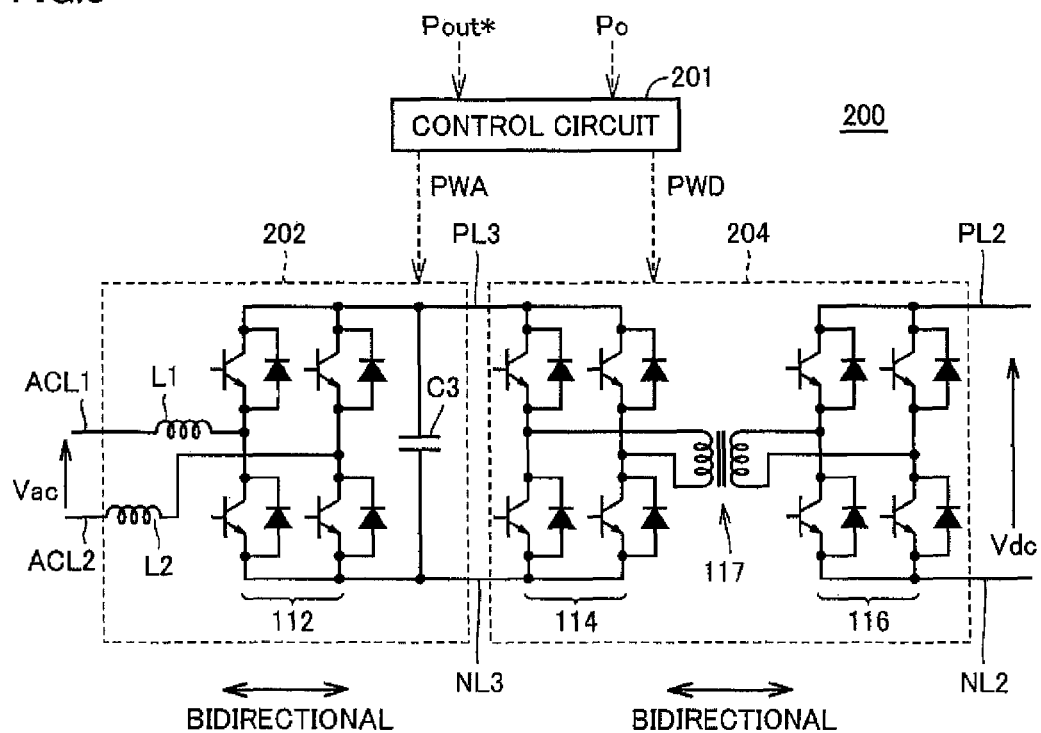
FIG. 3 is a circuit diagram of an exemplified configuration of the external charger shown in FIG. 1.

FIG. 3 represents an exemplified configuration of external charger 200.

Referring to FIG. 3, external charger 200 includes a control circuit 201, an AC/DC converter 202, and a DC/DC converter 204.

AC/DC converter 202 includes reactors L1 and L2, a smoothing capacitor C3, and a bridge circuit 112. Reactor L1 is connected in series with power line ACL1. Reactor L2 is connected in series with power line ACL2. Bridge circuit 112 converts AC voltage Vac between power lines ACL1 and ACL2 into DC voltage for output to power line PL4 and ground line NL4 by the on/off control of the power semiconductor switching element. Smoothing capacitor C1 is connected between power line PL4 and ground line NL4.

DC/DC converter 204 includes bridge circuits 114 and 116, and a transformer 117.

Bridge circuit 114 converts the DC voltage of power line PL4 and ground line NL4 into AC power for output to the primary side of transformer 117 by the on/off control of the power semiconductor switching element. Transformer 117 converts the AC voltage of the primary side according to a predetermined primary/secondary side winding ratio for output to the secondary side.

Bridge circuit 116 converts the AC voltage of the secondary side of transformer 117 into DC voltage, and outputs the converted DC voltage Vdc to power line PL2 and ground line NL2 by the on/off control of the power semiconductor switching element.

Accordingly, AC voltage Vac from external power supply 260 (for example 100 VAC) can be converted into DC voltage Vdc for charging power storage device 110 while ensuring insulation between external power supply 260 and power storage device 110.

In the examples of FIGS. 1 and 3, each of AC/DC converter 202 and DC/DC converter 204 is configured to allow bidirectional electric power conversion.

Specifically, DC/DC converter 204 is further capable of converting DC voltage Vdc transmitted from power storage device 110 to power line PL2 and ground line NL2 into DC voltage for output to power line PL4 and ground line NL4. This function can be realized by the on/off control of the power-directed semiconductor switching element constituting bridge circuits 114 and 116.

Similarly, AC/DC converter 202 is capable of converting the DC voltage between power line PL3 and ground line NL3 into AC power equivalent to the electric power from external power supply 260 for output onto power lines ACL1 and ACL2. This function can be realized by the on/off control of the power semiconductor switching element constituting bridge circuit 112.

Control circuit 201 generates a control signal PWA of AC/DC converter 202 and a control signal PWD of DC/DC converter 204 according to power command value Pout* from ECU 300. The ON/OFF of the power semiconductor switching element constituting bridge circuits 112, 114 and 116 is controlled by control signals PWA and PWD. Control signals PWA and PWD are adjusted according to the deviation between power command value Pout* and the detected output power Po.

As to specific control of the power semiconductor switching element for AC/DC conversion and DC/AC conversion with power control at bridge circuits 112, 114 and 116, the well-known control can be applied arbitrarily. Therefore, detailed description thereof will not be repeated.

Referring to FIG. 1 again, the power supply device further includes an outlet 230 and a relay 235. Outlet 230 is the AC receptacle to output commercial AC power supply.

Outlet 230 is connected to power lines ACL1 and ACL2 via relay 235. Relay 235 is controlled to be turned ON by a switching operation made by the user of electric powered vehicle 100, or in response to connection of electric load 290 to outlet 230.

In the exemplified configuration of FIG. 1, it is understood that outlet 230 constitutes "connection node" to connect electric load 290 to the path between external power supply 260 and power storage device 110. In other words, electric load 290 is rendered operable by the AC power on power lines ACL1 and ACL2 by connection to outlet 230. Power detector 255 is configured to detect power consumption P1 of electric load 290. The detected power consumption P1 is transmitted to ECU 300.

When electric load 290 is connected to outlet 280 under the state where external power supply 260 is connected to electric powered vehicle 100, electric load 290 is connected to the path between external power supply 260 and power storage device 110. Power consumption P1 of electric load 290 is ensured by the sum of output power Po of external charger 200 and electric power Psys supplied from external power supply 260. Specifically, the relationship of P1=Psys+Po is established. When Po<0, external power supply 260 supplies power that is the sum of charging power of power storage device 110 and power consumption P1 of electric load 290. When Po>0, the insufficient amount of output power Po for power consumption P1 is supplied from external power supply 260. It is desirable to provide control such that Psys≥0 is maintained in order to prevent occurrence of reverse power flow.

ECU 300 outputs a control signal for controlling SMR 115, PCU 120, external charger 200, CHR 240, and the like.

ECU 300 receives a detection value of voltage VB, temperature TB, and current IB from a sensor (not shown) in power storage device 110. ECU 300 calculates the SOC (State of Charge) indicating the charging state of power storage device 110 based on at least one of the detection values. In an external charging mode, power command value Pout* is set appropriately to control the charging/discharging of power storage device 110.

Although a configuration in which the control function of respective devices in electric powered vehicle 100 is generically embodied in ECU 300 in FIG. 1, the function of ECU 300 may be partially arranged in a divided manner. For example, the control function of the devices of the external charge system (for example, external charger 200 and CHR 240) may be provided in another ECU differing from ECU 300.

When the temperature is low, power storage device 110 generally constituted of a secondary battery has the charging/discharging efficiency degraded due to the rise of internal resistance. Therefore, when external power supply 260 is connected to electric powered vehicle 100 in the case where the temperature of power storage device 110 is low, it is preferable to warm up power storage device 110 to prepare for external charging or subsequent vehicle running. In the present embodiment, warm up control of power storage device 110 (hereinafter, also referred to as "battery warm up control") is executed taking advantage of electric load 290 connected to the path between external power supply 260 and power storage device 110.

Figure 4:
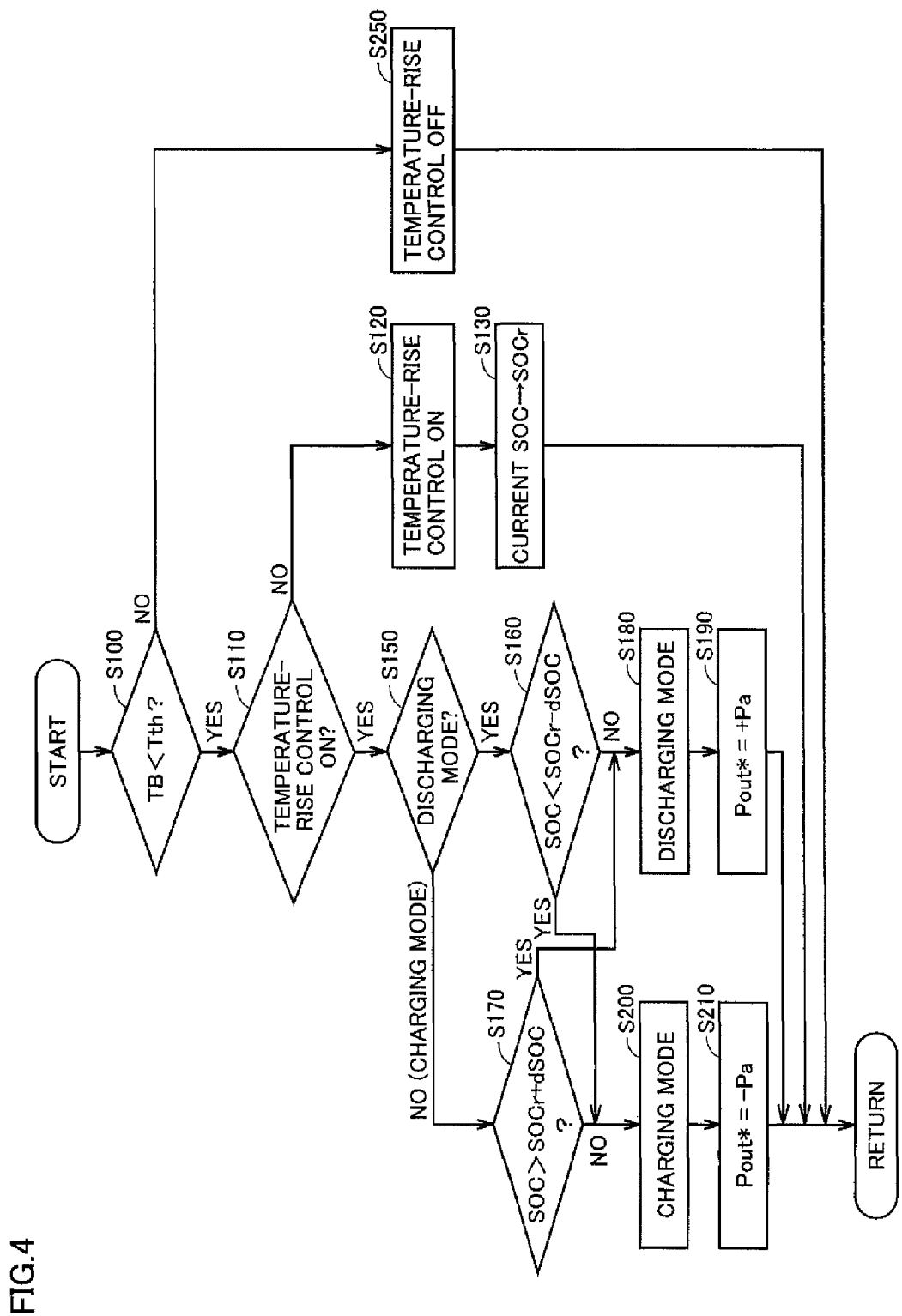
FIG. 4 is a flowchart of control processing of battery warm up control according to an embodiment of the present invention.

FIG. 4 is a flowchart of the control processing of battery warm up control according to an embodiment of the present invention. The processing of each step shown in FIG. 4 can be realized by software processing or hardware processing through ECU 300.

The processing of the flowchart of FIG. 4 is executed periodically when external power supply 260 is connected to electric powered vehicle 100 and electric load 290 is connected to the path between external power supply 260 and power storage device 110.

Referring FIG. 4, ECU 300 determines at step S100 whether the temperature is of a level requiring battery warm up based on a temperature TB of power storage device 110. For example, a determination is made that battery warm up is required when temperature TB is lower than a determination value Tth.

ECU 300 turns OFF the temperature-rise control directed to battery warm up at step S250 when battery warm up is not required (NO determination at S100).

In contrast, when battery warm up is required, ECU 300 proceeds to step S10 to determine whether temperature-rise control is already executed (ON) or not. When temperature-rise control is not yet executed (NO determination at S110), ECU 300 proceeds to step S120 to turn ON the temperature-rise control. Accordingly, temperature-rise control is initiated.

At step S130, ECU 300 stores the SOC of power storage device 110 at the time of initiating temperature-rise control as an SOC reference value (SOCr) in temperature-rise control. When temperature-rise control is initiated, a YES determination is made at step S110 at the next processing.

When temperature-rise control is ON (YES determination at S10), ECU 300 executes temperature-rise control that alternately causes a discharging mode (first state) and a charging mode (second state) by the processing of steps S150-S210 set forth below.

At step S150, ECU 300 determines whether one of the discharging mode and charging mode is selected. ECU 300 is set in advance such that one of the modes (for example, the discharging mode) is fixedly selected at the time of initiating temperature-rise control.

When the discharging mode is selected (YES determination at S150), ECU 300 proceeds to step S160 to compare the current SOC with the SOC lower limit of temperature-rise control. This SOC lower limit is set to a value of the SOC reference value (SOCr) set through step S120 minus a predetermined value dSOC.

When the current SOC is higher than the SOC lower limit in the discharging mode (NO determination at S160), ECU 300 proceeds to step S180 to continue the discharging mode. Further, ECU 300 proceeds to step S190 to set power command value Pout*=+Pa of external charger 200. Accordingly, external charger 200 converts the electric power discharged from power storage device 110 into AC power according to the power command value (Pout*=Pa) for output onto power lines ACL1 and ACL2.

Therefore, in the discharging mode, external power supply 260 supplies the insufficient amount of output power Po from external charger 200 for power consumption P1 of electric load 290 (Psys=P1−Pa). Thus, in the discharging mode, power consumption P1 of electric load 290 is ensured in association with the discharge of power storage device 110.

In contrast, when the current SOC is lower than the SOC lower limit in the discharging mode (YES determination at 8160), ECU 300 proceeds to step S200 to designate transition from the discharging mode to the charging mode. Further, ECU 300 proceeds to step S210 to set power command value Pout*=−Pa of external charger 200. Accordingly, external charger 200 converts the AC power on power lines ACL1 and ACL2 into DC power directed to charging power storage device 110 onto power line PL2, according to power command value (Pout*=−Pa).

Therefore, external power supply 260 supplies both the charging power (−Pa) of power storage device 110 and power consumption P1 of electric load 290 (Psys=P1+Pa). Thus, in the discharging mode, power consumption P1 of electric load 290 is ensured in association with the charging of power storage device 110.

When the charging mode is selected (NO determination at S150), ECU 300 proceeds to step S170 to compare the current SOC with the SOC upper limit in temperature-rise control. This SOC upper limit is set to a value of the SOC reference value (SOCr) set through step S120 plus a predetermined value dSOC.

When the current SOC is lower than the SOC upper limit in the charging mode (NO determination at S170), ECU 300 proceeds to the processing of steps S200 and S210 to continue the charging mode. In contrast, when the current SOC is higher than the SOC upper limit in the charging mode (YES determination at step S170), control proceeds to the processing of steps S180 and S190 to designate transition from the charging mode to the discharging mode.

Thus, by the execution of temperature-rise control setting a charging mode and a discharging mode alternately, temperature TB of power storage device 110 rises by the charging/discharging. When temperature TB becomes higher than determination value Tth by the temperature-rise control, a NO determination is made at step S100. Accordingly, ECU 300 proceeds to step S210 to turn OFF the temperature-rise control. As a result, the temperature-rise control is terminated.

Determination value Tth is preferably set with hysteresis between the OFF time and ON time of temperature-rise control, i.e. between the determination of initiating temperature-rise control and determination of terminating temperature-rise control. Therefore, when temperature-rise control is initiated, determination value Tth is increased than that prior to initiating temperature-rise control.

Figure 5:
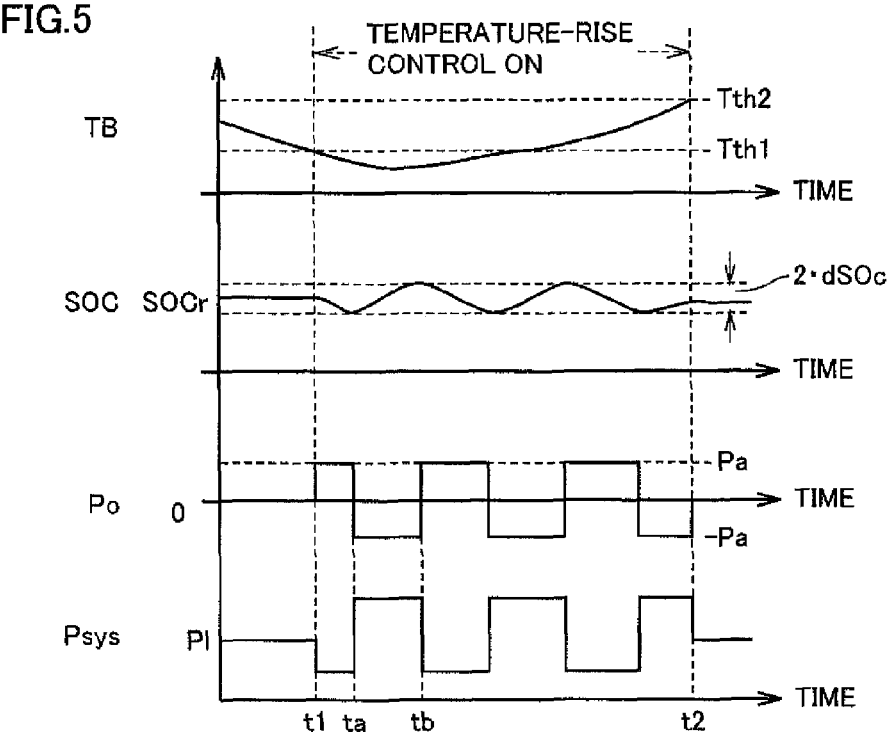
FIG. 5 is a waveform diagram describing an operation of battery warm up control according to an embodiment of the present invention.

FIG. 5 represents an example of a waveform of the operation of the battery warm up control according to an embodiment of the present invention.

Referring to FIG. 5, since temperature TB of power storage device 110 before time t1 is higher than a determination value Tth1 directed to determining initiation of temperature-rise control, temperature-rise control is OFF. Through outlet 230, power consumption P1 of electric load 290 connected to the path between external power supply 260 and power storage device 110 is supplied by external power supply 260. Specifically, Psys=P1.

When temperature TB becomes lower than determination value Tth1 at time t1, temperature-rise control is turned ON. When temperature-rise control is initiated, the SOC at that point in time (time t1) is set as the SOC reference value (SOCr) in the temperature-rise control. Further, the SOC upper limit (SOCr+dSOC) and the SOC lower limit in the temperature-rise control are determined based on SOCr as the reference.

In the example of FIG. 5, the discharging mode is selected at the time of initiating temperature-rise control. Accordingly, from time t1, Pa is output from external charger 200 in association with the discharging of power storage device 110. Therefore, supplied electric power Psys from external power supply 260 decreases from P1 to P1−Pa. In the discharging mode, the SOC of power storage device 110 decreases gradually.

At time ta, the temperature-rise control is switched from the discharging mode to the charging mode by the SOC decreasing down to the SOC lower limit (SOCr−dSOC) of temperature-rise control. Accordingly, from time t1, output power Po=−Pa of external charger 200 is established for charging power storage device 110. Accordingly, supplied electric power Psys from external power supply 260 increases to P1+Pa. In the charging mode, the SOC of power storage device 110 gradually increases.

Then, at time tb, temperature-rise control is switched from the charging mode to the discharging mode by the power storage device SOC increasing to the SOC upper limit (SOCr+dSOC). Thereafter, the discharging mode and charging mode are set alternately according to SOC decrease in association with discharging of power storage device 110 in the discharging mode and SOC increase in association with charging of power storage device 110 in the charging mode.

As a result, temperature TB of power storage device 110 increases by the repeated charging/discharging of power storage device 110. At time t2, the temperature-rise control is turned OFF in response to temperature TB arriving at a determination value Tth2 directed to determining termination of temperature-rise control.

Thus, the repeated charging/discharging of power storage device 110 while driving electric load 290 in the battery warm up control of the present embodiment allows the interior of power storage device 110 to be warmed up directly by the internal heat generation in association with charging/discharging. Thus, the temperature rises efficiently. Furthermore, since power storage device 110 is charged/discharged while the power consumption of electric load 290 is ensured, extra power consumption for warm up control such as driving an electric heater or the like for heating will not occur. Thus, power consumption required for raising the temperature of power storage device 110 can be suppressed while power storage device 110 can be warmed up efficiently.

Furthermore, since the transition between a charging mode and a discharging mode is determined according to the SOC, the varying range of SOC by temperature-rise control can be monitored. Particularly, by setting the varying range of SOC on the basis of the SOC at the point in time of temperature-rise initiation as the reference, the SOC of the power storage device can be prevented from varying significantly by the temperature-rise control.

Moreover, the electric power (Pa) input to and output from external charger 200 in temperature-rise control is preferably equal to power consumption P1 of electric load 290. This is advantageous in that the temperature-rise effect can be improved since the charging/discharging electric power of power storage device 110 is ensured at the maximum level while output of electric power from electric powered vehicle 100 to external power supply 260, i.e. reverse power flow of the system electric power, can be prevented.

(Modification)

Figure 6:
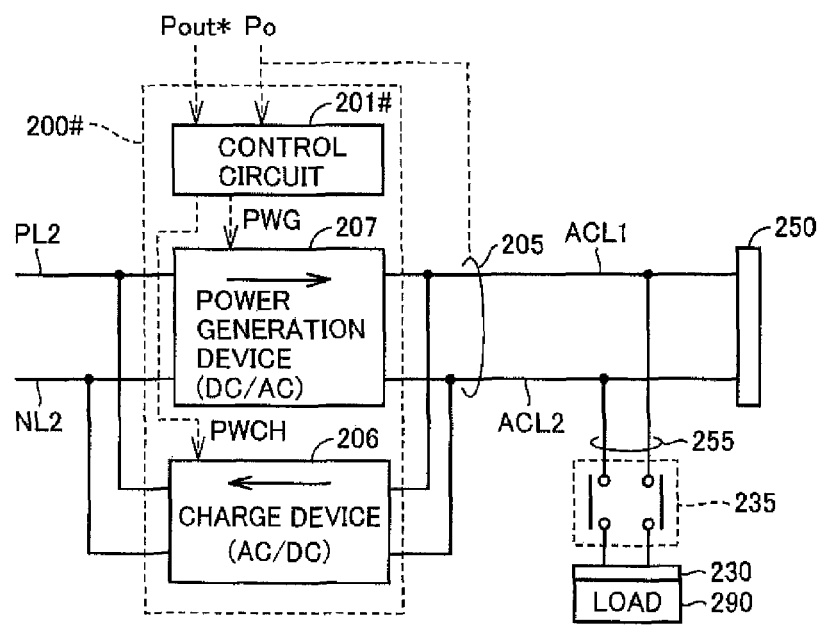
FIG. 6 is a block diagram of an exemplified configuration of an external charger for a power supply device at an electric powered vehicle according to a modification of an embodiment of the present invention.

FIG. 6 is a block diagram of an exemplified configuration of an external charger for a power supply device at an electric powered vehicle according to a modification of an embodiment of the present invention.

Referring to FIG. 6, the modification of the embodiment of the present invention has external charger 200 in the configuration of FIG. 1 replaced with an external charger 200# shown in FIG. 6. The configuration of the remaining elements of the power supply device in the electric powered vehicle according to a modification of embodiment of the present invention is similar to that of FIG. 1. Therefore, detailed description thereof will not be repeated.

External charger 200# includes a control circuit 201#, a charge device 206, and a power generation device 207.

Charge device 206 converts the AC power on power lines ACL1 and ACL2 into DC power for charging power storage device 110. Power generation device 207 converts the electric power (DC power) from power storage device 110 into AC power of a level equivalent to the AC power from external power supply 260 for output onto power lines ACL1 and ACL2.

In other words, external charger 200# is equivalent to a divided version of external charger 200 (FIG. 1) executing bidirectional AC/DC power conversion, i.e. divided into a charge device 206 for unidirectional AC/DC power conversion and a power generation device 207 for unidirectional DC/AC power conversion.

For example, charge device 206 can be provided by configuring bridge circuit 112 in external charger 200 shown in FIG. 3 as a diode bridge without using a power semiconductor switching element. Similarly, power generation device 207 can be provided by configuring bridge circuit 114 in external charger 200 of FIG. 3 as a diode bridge without using a power semiconductor switching element.

Control circuit 201# generates a control signal PWCH of charge device 206 and control signal PWG of power generation device 207 according to power command value Pout* from ECU 300. At external charger 200#, one of charge device 206 and power generation device 207 is selectively activated according to a positive or negative power command value Pout*. Control signal PWCH or PWG is adjusted according to the deviation between power command value Pout* and detected output power Po.

Figure 7:
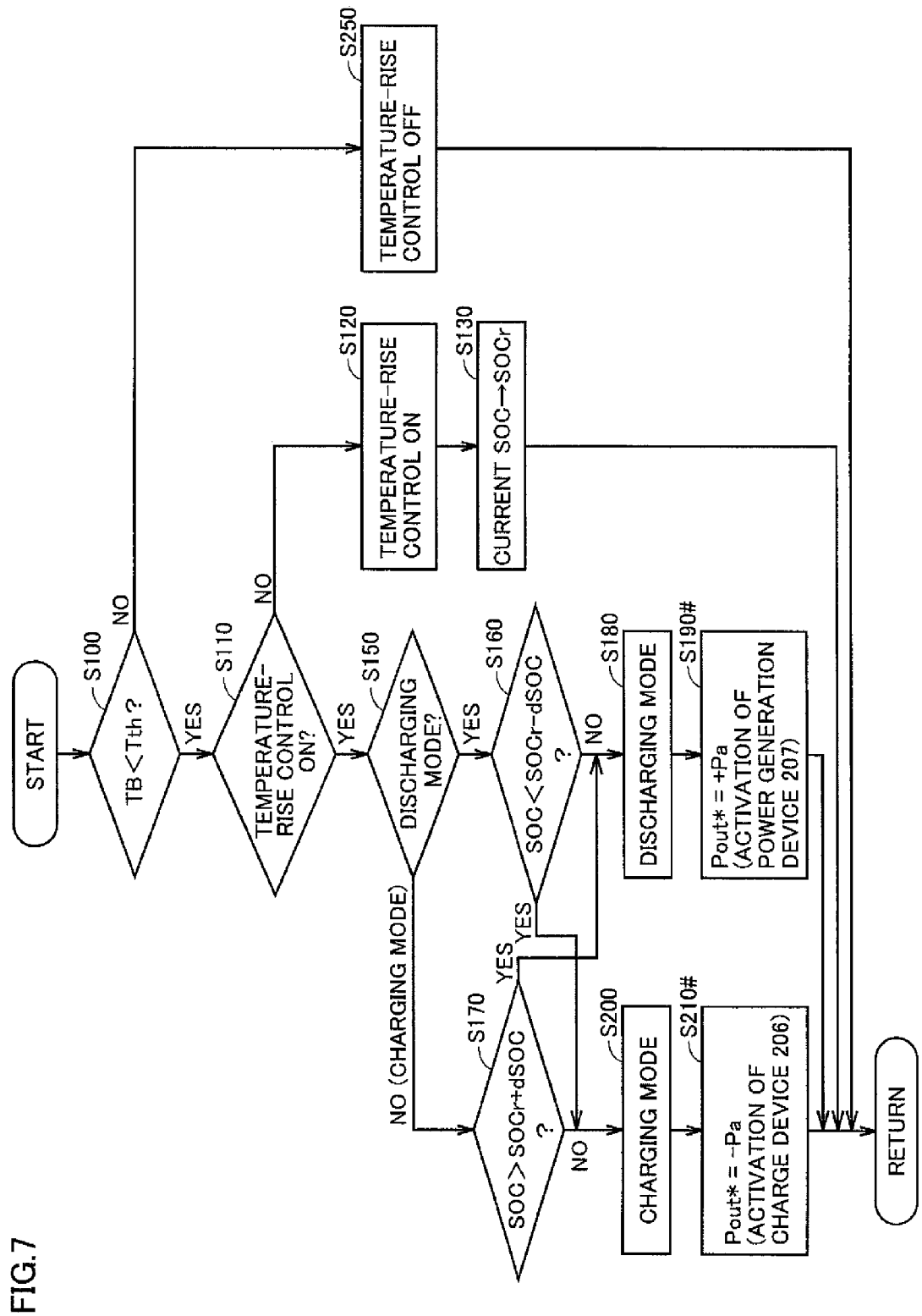
FIG. 7 is a flowchart of control processing of battery warm up control according to a modification of an embodiment of the present invention.

FIG. 7 is a flowchart describing the processing in battery warm up control according to a modification of the embodiment of the present invention.

In comparison between FIGS. 7 and 4, the battery warm up control according to a modification of the embodiment of the present invention has ECU 300 execute steps S190# and S210#, instead of steps S190 and S210 of FIG. 4. The processing of the remaining steps is similar to that of FIG. 4. Therefore, detailed description thereof will not be repeated.

When a discharging mode is selected, ECU 300 activates power generation device 207 at step S190#. For the output electric power of power generation device 207, power command value Pout*=+Pa is set. At charge device 206, all the power semiconductor switching elements can be fixed at OFF. Further, the number of power semiconductor switching elements under ON/OFF control at power generation device 207 is lower than that in external charger 200 of FIG. 3.

When a charging mode is selected, ECU 300 activates charge device 206 at step S210#. For the output electric power of charge device 206, power command value Pout*=−Pa is set is set. Here, all the power semiconductor switching elements at power generation device 207 can be fixed at OFF. Further, the number of power semiconductor switching elements under ON/OFF control at charge device 206 is lower than that in external charger 200 of FIG. 3.

Thus, at the power supply device for the electric powered vehicle according to a modification of the embodiment, battery warm up control can be executed at high efficiency by repeatedly carrying out a discharging mode and a charging mode for ensuring the power consumption of electric load 290 in association with charging/discharging of power storage device 110, likewise with the configuration shown in FIGS. 1 and 3.

Furthermore, by removing power generation device 207 from the configuration shown in FIG. 6, there can be provided a configuration of an external charger applicable to an electric powered vehicle of the type not having an outlet 230 arranged. Therefore, external charger 200# of FIG. 6 is advantageous from the standpoint of design generalization since the degree of component-sharing is increased between an electric powered vehicle of the type with an outlet 230 and an electric powered vehicle of the type absent thereof.

The configuration subsequent to power line PL1 (the vehicle running system) according to the present embodiment and modification thereof is not limited to the depicted configuration. The configuration can be also applied to any electric powered vehicle incorporating an electric motor directed to generating a wheel driving force such as an electric vehicle, hybrid vehicle, fuel cell vehicle, as mentioned above.

Additionally, an arbitrary circuit configuration can be employed for external charger 200 as long as bidirectional or unidirectional power conversion in association with power control set forth above is allowed. For example, although an insulation type external charger employing a transformer 117 is exemplified in FIG. 3, a non-insulation type charge device may be employed instead.

Furthermore, although the present embodiment and modification thereof have been described with electric load 290 intended to be connected to outlet 230, application of the present invention is not limited to such a configuration. In other words, electric load 290 may be connected to the path between external power supply 260 and power storage device 110 without the intervention of outlet 230. For example, the auxiliary device used during external charging may be used as electric load 290 for the battery warm up control.

Further, it is intended that the connection end of outlet 230, i.e. the connection end of electric load 290, is not limited to power lines ACL1 and ACL2. In other words, the present invention is applicable as long as a configuration in which electric power can be supplied from both power storage device 110 and external power supply 260 can be realized by having electric load 290 electrically connected to the path between external power supply 260 and power storage device 110.

It should be understood that the embodiments disclosed herein are illustrative and non-restrictive in every respect. The scope of the present invention is defined by the terms of the claims, rather than the description above, and is intended to include any modification within the scope and meaning equivalent to the terms of the claims.

INDUSTRIAL APPLICABILITY

The present invention can be applied to an electric powered vehicle incorporating a mechanism of allowing charging of a vehicle-mounted power storage device by a power supply external to the vehicle.

REFERENCE SIGNS LIST 100 electric powered vehicle; 110 power storage device; 112, 114, 116 bridge circuit; 115 system main relay (SMR); 117 transformer; 121, 170 converter; 122 inverter; 130 motor generator; 140 power transmission gear; 145 relay (SMR): 150 driving wheel; 200, 200# external charger; 201, 201# control circuit; 202 AC/DC converter; 204 DC/DC converter; 205, 255 power detector; 206 charge device; 207 power generation device; 230 outlet; 235 relay (outlet); 240 charge relay (CHR); 250 charging inlet; 260 external power supply; 270 charge connector; 280 charge cable; 280 outlet; 290 electric load; 300 control device (ECU); ACL1, ACL2, HPL, PL1, PL2, PL3 power line; C1, C2, C3 smoothing capacitor; IB current (power storage device); L1, L2 reactor; NL1, NL2, NL3 ground line; PWA, PWD, PWC, PWCH, PWD, PWG, PWI, SE1, SE2 control signal; P1 power consumption (electric load); Po output power (external charger); Pout* power command value; Psys supplied electric power (external power supply); TB temperature (power storage device); Tth, Tth1, Tth2 determination value; VB voltage; Vac AC voltage; Vdc DC voltage.

The invention claimed is:

1. A power supply device for an electric powered vehicle, comprising:
    a power storage device for storing electric power input/output with respect to an electric motor generating vehicle driving power,
    a power line connected to an external power supply during external charging,
    a power converter for executing bidirectional power conversion between AC power of said power line and DC power input to and output from said power storage device,
    an outlet electrically connected to said power line, and
    a control device for controlling DC power input to and output from said power storage device by said power converter,
    said control device configured to execute temperature-rise control, in an event of a temperature of said power storage device being lower than a predetermined temperature when said external power supply is connected to said power line, and said electric load is connected to said outlet, alternately causing a first state where electric power output to said power line from said power converter is controlled such that power consumption of said electric load is ensured in association with discharging of said power storage device, and a second state where electric power input to said power storage device from said power converter is controlled such that power consumption of said electric load is ensured in association with charging of said power storage device.

2. The power supply device for an electric powered vehicle according to claim 1, wherein said control device controls transition from said first state to said second state and transition from said second state to said first state according to a state of charge of said power storage device.

3. The power supply device for an electric powered vehicle according to claim 2, wherein said control device designates transition to said second state when SOC decreases down to a first determination value lower than the SOC at a point in time of initiating said temperature-rise control in said first state, and designates transition to said first state when the SOC increases up to a second determination value higher than the SOC at the point in time of initiating said temperature-rise control in said second state.

4. The power supply device for an electric powered vehicle according to claim 1, wherein said control device controls said power converter such that electric power discharging from said power storage device in said first state is equal to power consumption of said electric load.

5. The power supply device for an electric powered vehicle according to claim 1, wherein
said power converter includes
a charge device for converting said AC power of said power line into said DC power directed to charging said power storage device, and
a power generation device for converting said DC power from said power storage device into said AC power for output to said power line,
said control device stops said charge device while activating said power generation device in said first state, and stops said power generation device while activating said charge device in said second state.

6. An electric powered vehicle, comprising:
an electric motor for generating vehicle driving power,
a power storage device for storing electric power input/output with respect to said electric motor,
a power line connected to an external power supply during external charging,
a power converter for executing bidirectional power conversion between AC power of said power line and DC power input to and output from said power storage device,
an outlet electrically connected to said power line, and
a control device for controlling DC power input to and output from said power storage device by said power converter,
said control device configured to execute temperature-rise control, in an event of a temperature of said power storage device being lower than a predetermined temperature when said external power supply is connected to said power line, and said electric load is connected to said outlet, alternately causing a first state where electric power output to said power line from said power converter is controlled such that power consumption of said electric load is ensured in association with discharging of said power storage device, and a second state where electric power input to said power storage device from said power converter is controlled such that power consumption of said electric load is ensured in association with charging of said power storage device.

7. The electric powered vehicle according to claim 6, wherein said control device controls said power converter such that electric power discharging from said power storage device in said first state is equal to power consumption of said electric load.

8. The electric powered vehicle according to claim 6, wherein
said power converter includes
a charge device for converting said AC power of said power line into said DC power directed to charging said power storage device, and
a power generation device for converting said DC power from said power storage device into said AC power for output to said power line,
said control device stops said charge device while activating said power generation device in said first state, and stops said power generation device while activating said charge device in said second state.

9. A method of controlling a power supply device for an electric powered vehicle incorporating an electric motor generating vehicle driving power, said power supply device including
a power storage device for storing electric power input/output with respect to said electric motor,
a power line connected to an external power supply during external charging,
a power converter for executing bidirectional power conversion between AC power of said power line and DC power input to and output from said power storage device,
an outlet electrically connected to said power line, and
said method of controlling comprising:
the step of determining whether temperature-rise control of said power storage device is required or not based on a temperature of said power storage device, when said external power supply is connected to said power line, and said electric load is connected to said outlet, and
the step of executing said temperature-rise control, when a determination is made that said temperature-rise control is required, by alternately causing a first state where electric power output to said power line from said power converter is controlled such that power consumption of said electric load is ensured in association with discharging of said power storage device and a second state where electric power input to said power storage device from said power converter is controlled such that power consumption of said electric load is ensured in association with charging of said power storage device.

10. The method of controlling a power supply device for an electric powered vehicle according to claim 9, wherein said step of executing includes
the step of controlling transition from said first state to said second state and transition from said second state to said first state, according to a state of charge of said power storage device.

11. The method of controlling a power supply device for an electric powered vehicle according to claim 10, wherein said step of controlling includes
the step of designating transition to said second state when SOC decreases down to a first determination value lower than the SOC at a point in time of initiating said temperature-rise control in said first state, and
the step of designating transition to said first state when the SOC increases up to a second determination value higher than the SOC at the point in time of initiating said temperature-rise control in said second state.

12. The method of controlling a power supply device for an electric powered vehicle according to claim 9, wherein said step of executing includes
the step of controlling said power converter such that electric power discharging from said power storage device in said first state is equal to power consumption of said electric load.

13. The method of controlling a power supply device for an electric powered vehicle according to claim 9, wherein
said power converter includes
a charge device for converting said AC power of said power line into said DC power directed to charging said power storage device, and
a power generation device converting said DC power from said power storage device into said AC power for output to said power line,
said step of executing includes
the step of stopping said charge device while activating said power generation device in said first state, and
the step of stopping said power generation device while activating said charge device in said second state.

* * * * *